United States Patent [19]

Devenish, III et al.

[11] Patent Number: 5,367,598

[45] Date of Patent: Nov. 22, 1994

[54] INTERFACE CHASSIS FOR FIBER OPTIC TRANSPORT SYSTEM

[75] Inventors: William R. Devenish, III, Beaverton; Gustav J. Vercruyssen, Portland; Antonius B. Dirriwachter, Beaverton, all of Oreg.

[73] Assignee: NEC America, Inc., Melville, N.Y.

[21] Appl. No.: 140,784

[22] Filed: Oct. 21, 1993

[51] Int. Cl.⁵ ............................................. G02B 6/36
[52] U.S. Cl. ................................................ 385/135
[58] Field of Search ............... 385/53, 134, 135, 136, 385/137, 147

[56] References Cited

U.S. PATENT DOCUMENTS

| | | | |
|---|---|---|---|
| 4,898,448 | 2/1990 | Cooper | 385/135 X |
| 4,900,123 | 2/1990 | Barlow et al. | 385/135 X |
| 5,100,221 | 3/1992 | Carney et al. | 385/135 |
| 5,109,467 | 4/1992 | Hogan et al. | 385/135 |
| 5,208,894 | 5/1993 | Johnson et al. | 385/135 |
| 5,261,024 | 11/1993 | Allen et al. | 385/135 |
| 5,274,731 | 12/1993 | White | 385/135 |

Primary Examiner—John D. Lee
Attorney, Agent, or Firm—Lane, Aitken & McCann

[57] ABSTRACT

An interface housing which has a fiber spool to store slack in the fiber trunks and a card cage to interface the trunk mounted on the door of the housing. The door is hinged on one side of the housing so that, when the door swings open, the entire card cage and fiber spool are clear of the housing and readily accessible and releases the PCB lock. A ribbon connector connects the back plane of the card cage to an interface terminal board on the wall of the housing to which external wire-wrap and/or RJ48X connections may be made. Backup batteries in a tray are disposed along the bottom of the housing and secured in place with a cover. When the housing door swings shut, the fiber optic spool fits in front of back-up batteries in the tray and the card cage fits over the batteries.

8 Claims, 4 Drawing Sheets

INTERFACE CHASSIS FOR FIBER OPTIC TRANSPORT SYSTEM

BACKGROUND OF THE INVENTION

1. Field of the Invention

This invention relates to an improved interface chassis for fiber optic transport systems, and more particularly, to a fiber optic transport interface chassis that is compact in size, can be wall mounted, includes a battery back-up within the chassis, and provides ready access to components for field maintenance and repair.

2. Description of the Prior Art

Prior art fiber optic transport interface housings are bulky, owing to the necessity to provide a clear space around the components in the housing so that the components are accessible for maintenance and repair. Further, in prior art fiber optic interface housings, there is no provision to house a back-up battery.

SUMMARY OF THE INVENTION

An object of this invention is the provision of a wall mounted, compact interface housing for fiber optic transport systems. A housing that allows ready access to the interface components and also provides for the housing of a back-up battery.

Another object of this invention is the provision of an improved, passive lock to secure the interface cards in their respective card cage slots. A lock that prevents housing closure if it is not in position to secure the cards in the cage.

Briefly, this invention contemplates the provision of an interface housing in which a fiber spool to store slack in the fiber trunks and a card cage to interface the trunk are mounted on the door of the housing. The door is hinged on one side of the housing so that, when the door swings open, the entire card cage and fiber spool are clear of the housing and readily accessible. A ribbon connector connects the backplane of the card cage to an interface terminal board on the wall of the housing to which external wire-wrap and/or RJ48X connections may be made. Backup batteries in a tray are disposed along the bottom of the housing and covered by a battery cover. When the housing door swings shut, the fiber optic spool fits in front of back-up batteries and their cover and the card cage fits over the batteries.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
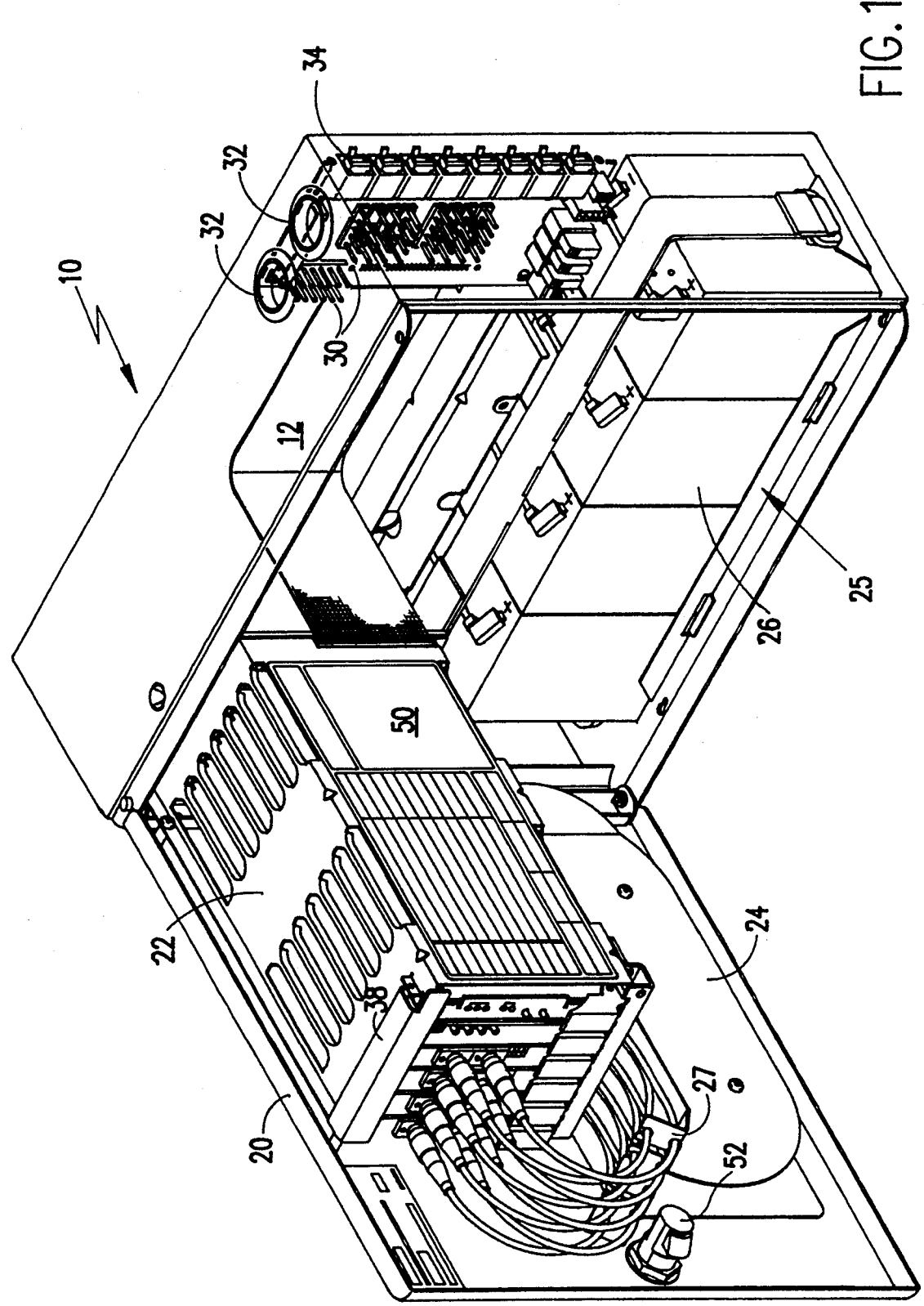
FIG. 1 is an isometric view of a fiber optic interface chassis in accordance with the teachings of this invention with the door open.

Referring now to the drawings, a sheet-metal housing, indicated by the general reference number 10, has a back wall 12, side walls 14, and top and bottom walls 16 and 18. Shoulder screws 17 pivotally secure a sheet-metal door 20 to the top and bottom walls of the housing. The door 20 is pivoted adjacent side wall 14 and swings between a closed position in which it covers the front of the housing and an open position in which it extends at approximately a right angle to the plane of the front of the housing, as shown in FIG. 1. A flexible member 21 cooperates with a pin 23 to hold the door in its open position.

A card cage 22 is mounted on the door 20 and extends over roughly the top half of the door. Region 50 provides a space for maintenance, records, identification labels, and the like. A fiber spool 24, to take up slack in the fiber trunks, is mounted on the door 20 immediately below the card cage 22. Preferably, the fiber spool provides a minimum two-inch radius in the fiber optic loop. A cable holder 27 is provided to engage the fiber optic cable coupled to the card cage and provide strain relief to the fiber optic cables.

Figure 3:
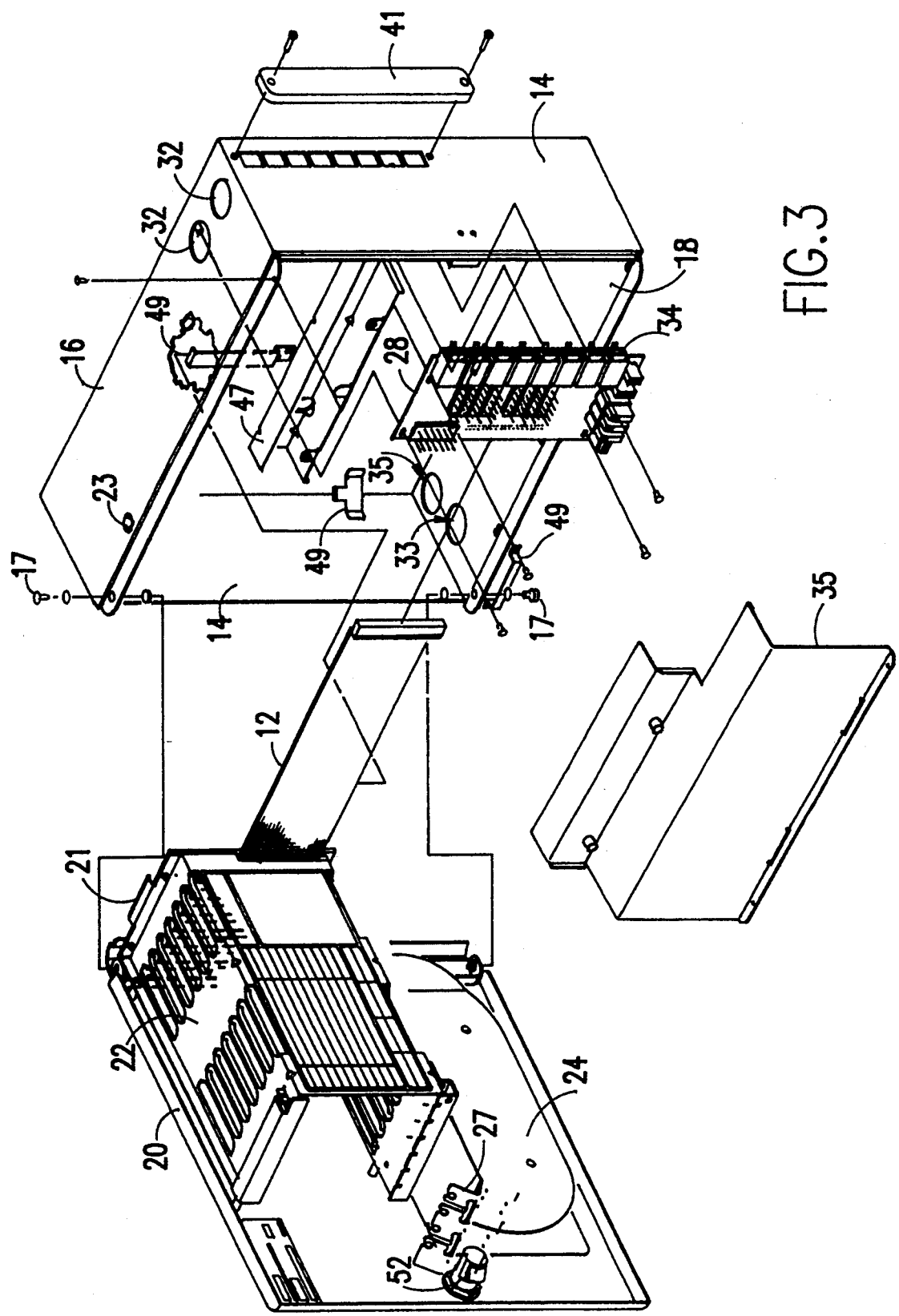
FIG. 3 is an isometric view similar to FIG. 1 but with certain components shown exploded and certain components omitted.
Figure 4:
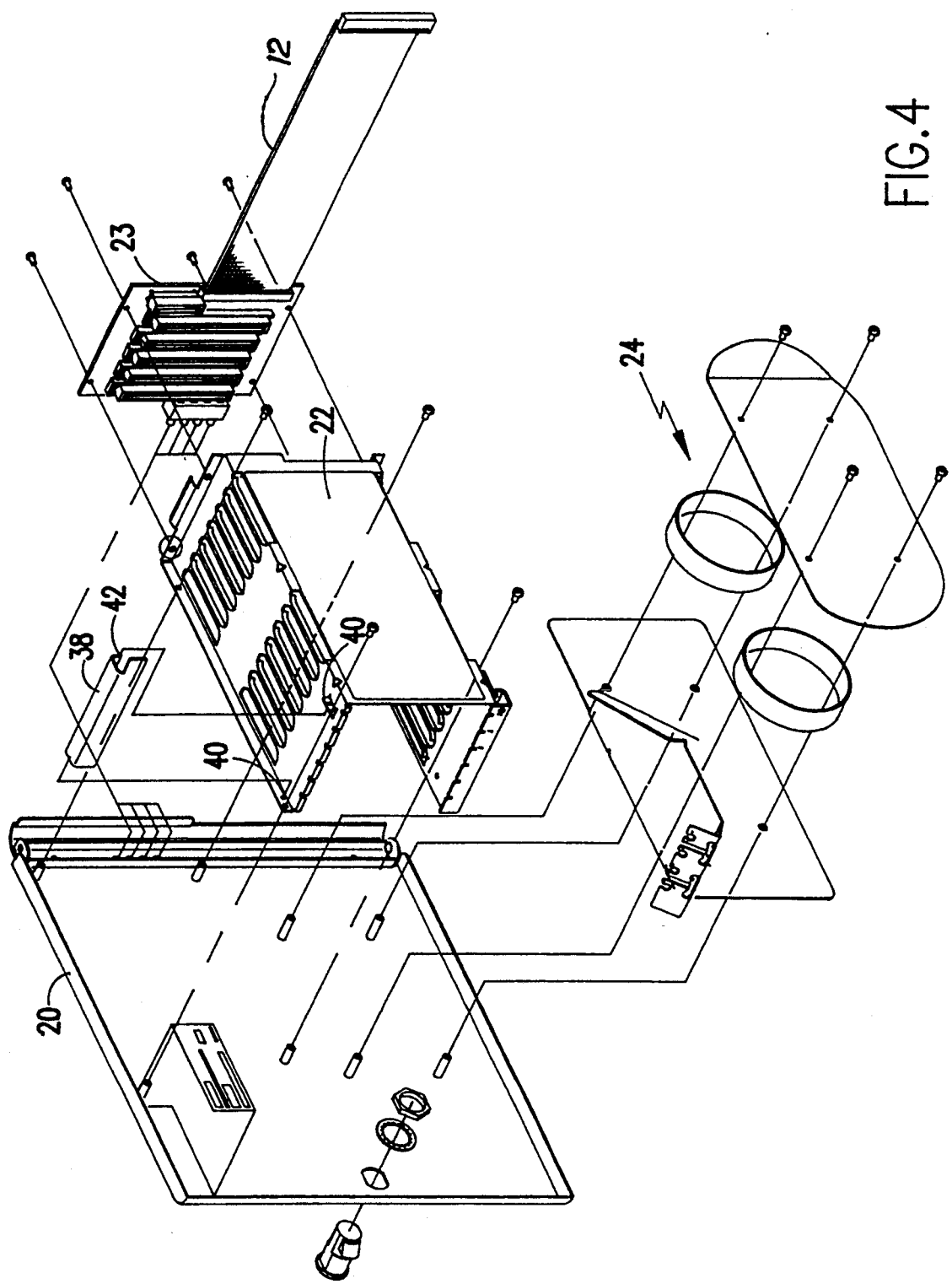
FIG. 4 is an isometric exploded view of the door assembly.

A set of back-up batteries 26 are mounted in a tray 25 on the floor of the housing 18. The battery tray has a velcro strap to hold the batteries in place. The tray slides into place, held in place by slots and tabs, and secured by a battery cover 35, shown in FIG. 3. When in place, the batteries sit back from the front of the housing and extend upwardly to a point below the bottom of the card cage so that, when the door 20 is closed, the card cage 22 fits over the batteries and the fiber spool 24 fits in front of the batteries 26.

A ribbon cable 12 connects a backplane 23 of the card cage 22 to a terminal board 28 mounted in the upper right-hand corner of the housing. The connections (not shown) from the ribbon cable at the back of the terminal board 28 are brought out to wire wrap pins 30, for line connections through openings 32 in the top of the housing, openings 33 in the bottom of the housing, and to standard RJ48X connectors 34, accessible from the side of the housing. A cover 41 is provided to cover the connectors 34. Member 47 provides cable ducting for cables entering through openings 33. Cable strain relief brackets 49 are also provided.

Figure 2:
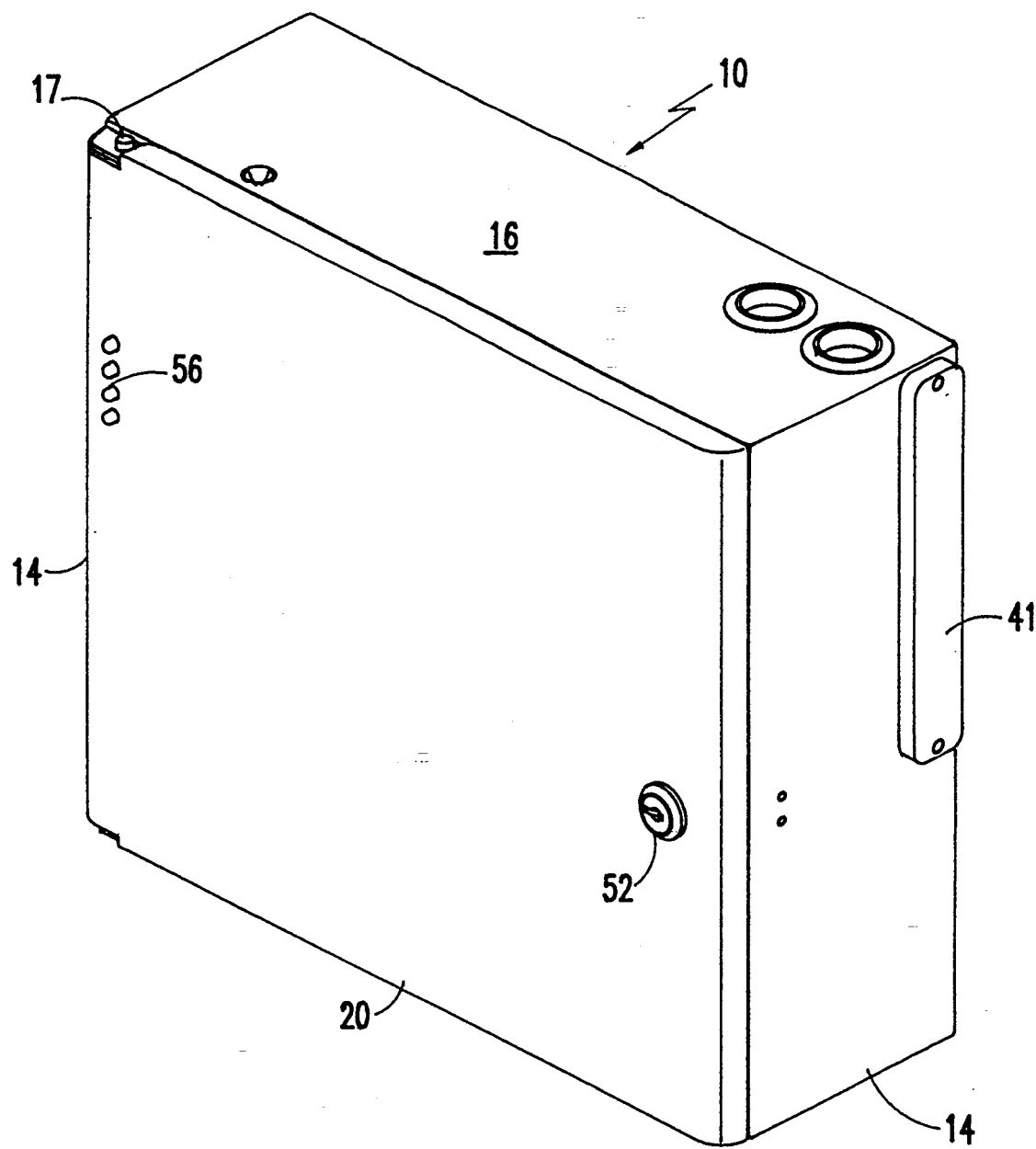
FIG. 2 is an isometric view of the transport shown in FIG. 1 with the door closed.

A "U"-shape positive card lock 38 is pivotally secured to the top of the card cage 22 by means of journals 40 and pins 42. Here it should be noted that the door 20 will not close unless the lock 38 is in a locked position and that with the door closed the top of the enclosure maintains the lock in a locked position. A lock 52 secures the door in its closed position. As best seen in FIG. 2, if desired, caps 54 may be used to cover opening 32 (or 33) when not in use, and a series of LED indicators 56 may be provided.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A chassis for interfacing fiber optic trunks to wire communication lines, comprising in combination:

an enclosure with first and second side walls, a top wall, a bottom wall, a rear wall, and a front opening;

a door;

means for pivotally attaching said door to said enclosure adjacent said first side wall of said enclosure, said door movable between a closed position covering said front opening and an open position;

a card cage for fiber optic to wire interface cards mounted on an upper portion of said door;

a spool for forming slack loops in said fiber optic trunks, said spool mounted on said door beneath said card cage and orientated so that said slack loops lie in a plane approximately parallel to said door;

a back plane connected to said card cage adjacent said means for pivotally attaching said door;

a terminal board secured to said rear wall adjacent said second side wall and adjacent said top wall;

flexible cable means connecting said back plane and said terminal board; and a back-up battery tray secured to said bottom wall for supporting a back-up battery assembly with said back-up battery assembly set back from said front opening whereby with said door in said open position said card cage and said spool are clear of said enclosure and with said door in said closed position said card cage fits in said enclosure above said back-up battery assembly and said spool fits in front of said back-up battery assembly.

2. A chassis for interfacing fiber optic trunks to wire communication lines as in claim 1, further including locking means mounted on said card cage for locking in place said wire interface cards in said card cage.

3. A chassis for interfacing fiber optic trunks to wire communication lines as in claim 2, wherein said locking means is a "U"-shaped clamp pivotally mounted on said card cage.

4. A chassis for interfacing fiber optic trunks to wire communication lines as in claim 1, wherein said spool provides a minimum of a two-inch radius in said slack loops.

5. A chassis for interfacing fiber optic trunks to wire communication lines as in claim 1, further including a passive stop for maintaining said door in its open position.

6. A chassis for interfacing fiber optic trunks to wire communication lines, comprising in combination:

an enclosure with first and second side walls, a top wall, a bottom wall, a rear wall, and a front opening;

a door;

means for pivotally attaching said door to said enclosure adjacent said first side wall of said enclosure, said door movable between a closed position covering said front opening and an open position at approximately a right angle to the plane of said front opening;

a card cage for fiber optic to wire interface cards mounted on an upper portion of said door;

a spool for forming slack loops in said fiber optic trunks, said spool mounted on said door beneath said card cage and orientated so that said slack loops lie in a plane approximately parallel to said door;

a back plane connected to said card cage adjacent said means for pivotally attaching said door;

a terminal board secured to said rear wall adjacent said second side wall and adjacent said top wall;

flexible cable means connecting said back plane and said terminal board; and a back-up battery tray secured to said bottom wall for supporting a back-up battery assembly with said back-up battery assembly set back from said front opening and that extends in length a majority of the distance from said first side wall to said second side wall and in height to a point below said card cage whereby with said door in said open position said card cage and said spool are clear of said enclosure and with said door in said closed position said card cage fits in said enclosure above said back-up battery assembly and said spool fits in front of said back-up battery assembly.

7. A chassis for interfacing fiber optic trunks to wire communication lines as in claim 6, further including locking means mounted on said card cage for locking in place said wire interface cards in said card cage.

8. A chassis for interfacing fiber optic trunks to wire communication lines as in claim 2, wherein said locking means is an "U"-shaped clamp pivotally mounted on said card cage.

* * * * *

UNITED STATES PATENT AND TRADEMARK OFFICE
CERTIFICATE OF CORRECTION

PATENT NO. : 5,367,598
DATED : November 22, 1994
INVENTOR(S) : William R. Devenish III, et al.

It is certified that error appears in the above-indentified patent and that said Letters Patent is hereby corrected as shown below:

In claim 8, column 4, line 41, Change "2" to --7--.

Signed and Sealed this

Thirty-first Day of January, 1995

*Attest:*

BRUCE LEHMAN

*Attesting Officer*    *Commissioner of Patents and Trademarks*